Patented Jan. 2, 1951

2,536,028

UNITED STATES PATENT OFFICE 2,536,028

PROCESS FOR THE MANUFACTURE OF ACETYLENIC ALCOHOLS AND ACETYLENIC GAMMA-GLYCOLS

Abraham Brothman, Long Island City, N. Y., Harry Gold, Philadelphia, Pa., and Philip Levine, Boston, Mass., assignors to A. Brothman and Associates, Long Island City, N. Y., a partnership No Drawing. Application April 19, 1948, Serial No. 21,866

6 Claims. (Cl. 260—638)

Our invention relates to an improved process for the manufacture of acetylenic alcohols and acetylenic gamma-glycols.

Acetylenic alcohols and acetylenic gamma-glycols have, in the past, been prepared by a variety of methods which, basically, are founded on a more or less common set of reaction mechanics. These basic reaction mechanics are shared not only by the various methods of preparation of acetylenic alcohols and acetylenic gamma-glycols, but also by the commonly known techniques for the preparation of the polymeric forms of aldehydes and ketones, the condensation of aldehydes and ketones with hydrocyanic acid, the condensation of aldehydes and ketones with chloroform, the condensation of aldehydes and ketones with amines, etc. Virtually all of the preparative methods for the mentioned syntheses are base-catalyzed reactions founded on the pronounced polarity of the carbonyl group, as illustrated in Equations 1, 2 and 3 below, and on the acidic properties of the material with which condensation takes place.

Thus, if for the purpose of illustration, we take "B" to represent a base catalyst and "HX" to represent the acidic material with which an aldehyde or ketone is to condense, the mechanics of such condensation reactions are properly represented as follows:

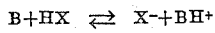

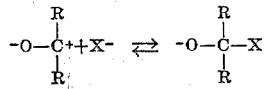

followed by any or all of the following to yield the final condensation product:

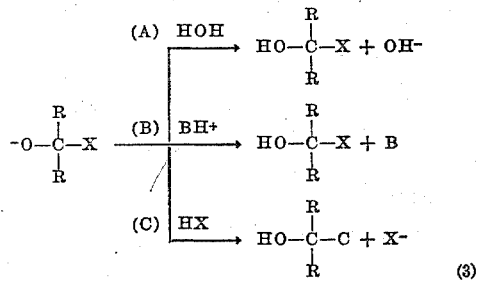

Equation 3 raises a vital question as to the propriety of including many of the condensations mentioned above and mentioned in our later discussion of the prior art within the broad classification of "base-catalyzed condensations." In some instances of such condensations, the base is used in stoichiometric (or even in excess of stoichiometric) equivalence as defined by Equation 1. In some instances, the base employed in accordance with Equation 1 does not result in the formation of a reaction product, BH+, which is capable of reacting in Equation 3 according to branch B to regenerate the base. Instances of the last named phenomenon are the use of alkali amides and alkoxides, in the furtherance of the aims of Equation 1 resulting in the formation of materials which are incapable of reacting according to branch B of Equation 3 to give the final condensation product, thereby regenerating the base. In other instances, neither the BH+ product of Equation 1 nor the acidic material, HX, is capable of undergoing the exchange operation indicated by branch C of Equation 3 in furtherance of obtaining the final condensation product, and consequently one is forced to fall back on the use of a hydrolysis according to branch A of Equation 3 to obtain the final condensation product.

The fact that in one or another instance, the so-called base-catalyst is employed in stoichiometric equivalence to the acidic condensation reaction as per Equation 1, and/or the fact that the product of neutralization, BH+, is incapable of regeneration in the strict sense of branch B in Equation 3 and/or the fact that the exchange operation represented by branch C of Equation 3 is incapable of sustaining the phenomenon set into motion by Equation 1 (namely, the production of X ion) would seem to argue against the propriety of referring to such bases as catalysts.

To encompass all of these instances, it is necessary to remove certain classical restrictions from the conventional concept of catalysis. It is eminently clear that the production of a product of neutralization, BH+, which is incapable of undergoing the reaction set forth by branch B of Equation 3 and/or the instances of an acidic material, HX, which is incapable of the interchange operation indicated by branch C of Equation 3, and which therefore necessitates the use of the hydrolysis represented by branch A of Equation 3 to yield the final condensation product, nevertheless results in the final production of a base, in this case, the OH− group.

What is involved, therefore, in the overwhelming number of instances, is the degradation of the base B of Equation 1 to a "weaker" base, the OH− group. In the sense that a base is employed to initiate the reaction by setting the stage for the phenomenon represented by Equation 1, and in the sense that a base is attained as per branch A of Equation 3 in the final step of the process, the degradation of the base, B, to the contrary notwithstanding, it is possible to refer to the reaction as having been base-catalyzed without being arbitrary. The fact that some of the instances require that the base B in Equation 1 be present in stoichiometric equivalence to the acidic reactant, HX, is no real limitation on the concept of catalysis, to the extent that in modern practice, many materials which are required in stoichiometric relationship to a given reactant have been referred to as catalysts.

Moreover, it is noteworthy that the standard literature gives instances of many materials which have been called catalysts even though they have undergone irreversible change during the progress of a reaction.

By the above interpretations, the base-catalyzed condensation of aldehydes or ketones with 1-alkynes to form acetylenic alcohols takes place according to the following equations:

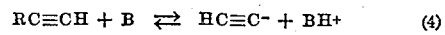

(4)

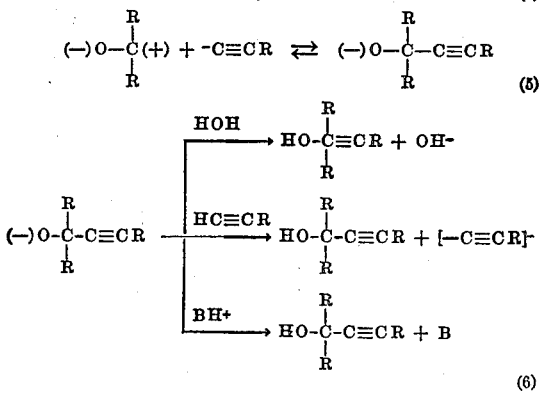

(5)

(6)

while the condensation of acetylene with carbonyl group-containing compounds to form acetylenic gamma-glycols takes place principally according to the following specific lines:

(7)

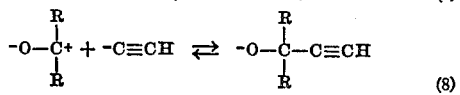

(8)

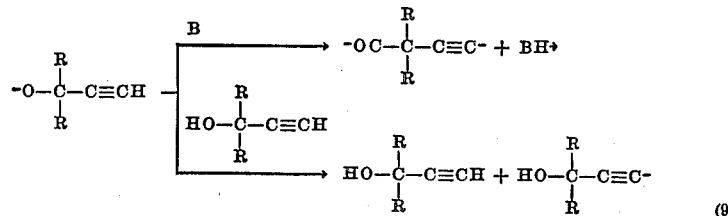

(9)

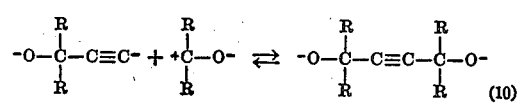

(10)

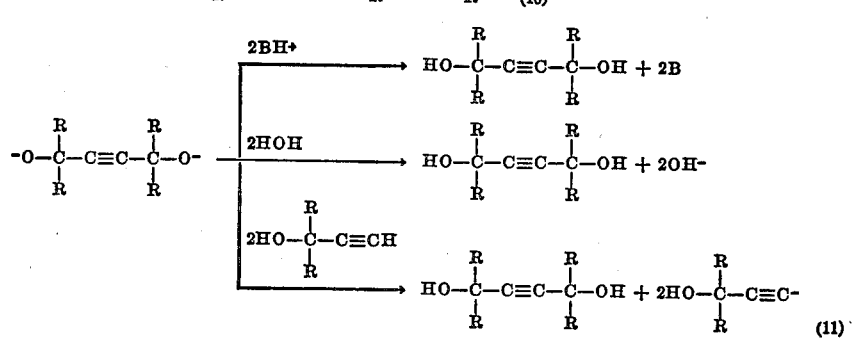

(11)

This fundamental system of reaction mechanics also describes the chief competitive side reaction(s) encountered in the preparation of acetylenic alcohols and acetylenic gamma-glycols, namely, the tendency of the carbonyl group-containing reactant to combine with itself to form polymeric condensation compounds of the aldehyde or ketone involved (where the aldehyde or ketone involved possesses alpha-hydrogens). Illustrating this side reaction tendency for the case of acetone, on the basis of the basic reaction mechanics principle cited above, we find that:

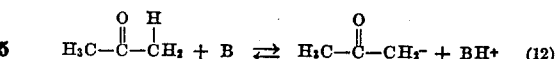

(12)

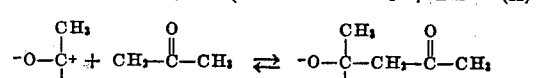

(13)

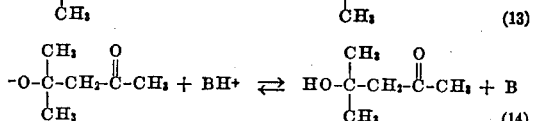

(14)

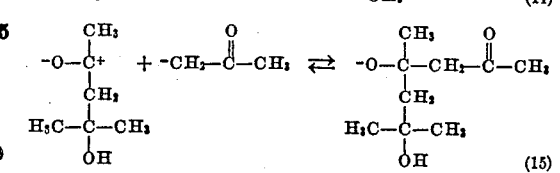

(15)

The above-presented basic reaction mechanics permits an evaluation of the prior art as well as of our invention.

Those methods of synthesis of acetylenic alcohols which have been based on a reaction between aldehydes or ketones, and the sodium or potassium salts of acetylene formed by a reaction between the corresponding alkali amides and acetylene are thus considered to have taken place according to the following typical equations:

(16)

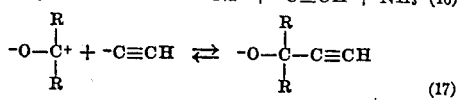

(17)

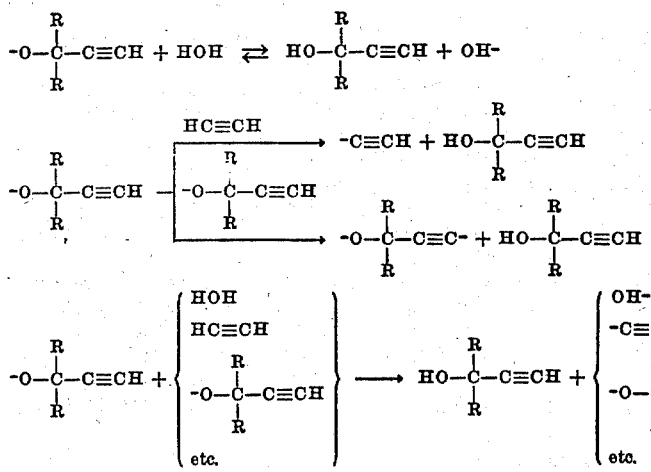

$$-O-\underset{R}{\overset{R}{C}}-C\equiv CH + HOH \rightleftarrows HO-\underset{R}{\overset{R}{C}}-C\equiv CH + OH^- \quad (a)$$

(b) (18)

(c)

Those preparative methods which have consisted of a reaction between aldehydes or ketones with sodamide to form sodium enolates, followed by a reaction of the enolates with 1-alkynes, are properly considered to have proceeded according to the following typical equations:

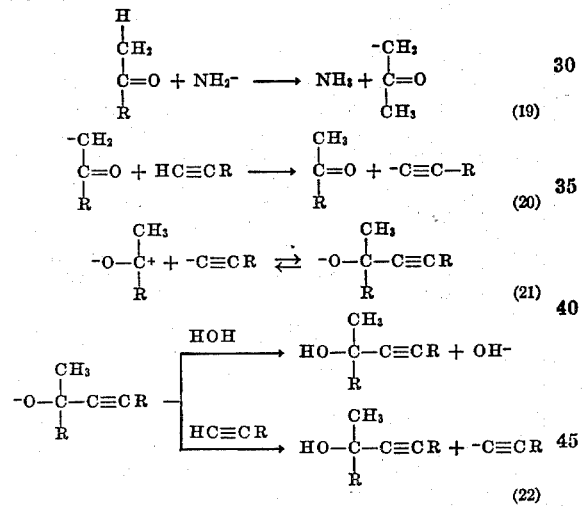

In the broad sense of our definition of base-catalyzed condensations, the sodamide employed in Equation 19 to produce the enolate may be dubbed the base catalyst in this instance, despite its somewhat indirect action.

Those preparative methods for the production of acetylenic alcohols and acetylenic gamma-glycols which have proceeded from a KOH-catalyzed condensation of calcium carbide with aldehydes or ketones may be presumed to conform to the following typical equations:

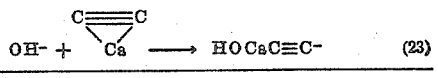

$$OH^- + \overset{C}{\underset{Ca}{\parallel\!\!\!\parallel}}C \longrightarrow HOCaC\equiv C^- \quad (23)$$

$$-O-\underset{R}{\overset{R}{C}}{}^+ + {}^-C\equiv CCaOH \rightleftarrows -O-\underset{R}{\overset{R}{C}}-C\equiv CCaOH \quad (24)$$

$$-O-\underset{R}{\overset{R}{C}}-C\equiv CCaOH \xrightarrow{2HOH}$$

$$HO-\underset{R}{\overset{R}{C}}-C\equiv CH + Ca(OH)_2 + OH^- \quad (25)$$

to form acetylenic alcohols; and, in forming gamma-glycols, $$OH^- + -O-\underset{R}{\overset{R}{C}}-C\equiv CCaOH \longrightarrow -O-\underset{R}{\overset{R}{C}}-C\equiv C^- + Ca(OH)_2 \quad (26)$$

$$-O-\underset{R}{\overset{R}{C}}-C\equiv C^- + {}^+\underset{R}{\overset{R}{C}}-O- \rightleftarrows -O-\underset{R}{\overset{R}{C}}-C\equiv C-\underset{R}{\overset{R}{C}}-O- \quad (27)$$

$$-O-\underset{R}{\overset{R}{C}}-C\equiv C-\underset{R}{\overset{R}{C}}-O- \xrightarrow{2HOH} HO-\underset{R}{\overset{R}{C}}-C\equiv C-\underset{R}{\overset{R}{C}}-OH + 2OH^- \quad (28)$$

Those techniques for the preparation of acetylenic alcohols which have proceeded from the preparation of the sodium or the potassium alcoholates of a variety of alcohols (including such ether-alcohols as ethylene glycol monoethyl ether) with the subsequent introduction of acetylene into a slurry or solution of the alcoholate containing or subsequently receiving the aldehyde or ketone with which condensation is to take place may be considered to occur according to the following typical equations:

$$RO^- + HC\equiv CH \rightleftarrows ROH + {}^-C\equiv CH \quad (29)$$

$$-O-\underset{R}{\overset{R}{C}}{}^+ + {}^-C\equiv CH \rightleftarrows -O-\underset{R}{\overset{R}{C}}-C\equiv CH \quad (30)$$

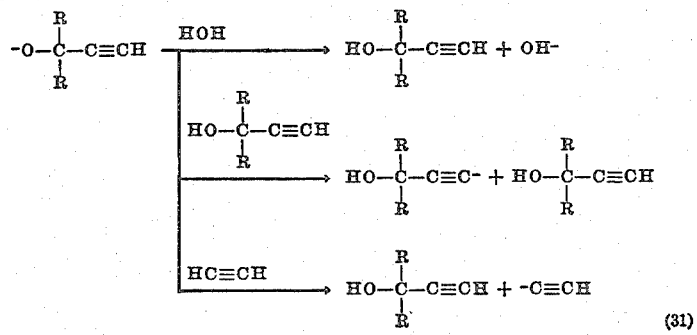

in which the sodium or potassium alcoholate functions in the capacity of the base catalyst.

Those techniques for the production of acetylenic alcohols and/or acetylenic gamma-glycols which involve the addition of potassium hydroxide to an excess of the ketone or the aldehyde (or a solution of the ketone or aldehyde), followed by the introduction of acetylene into the resultant system, may be said to proceed according to the following typical equations:

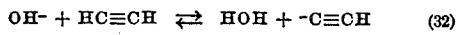

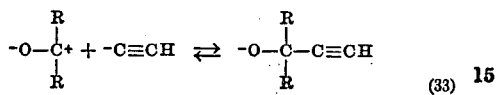

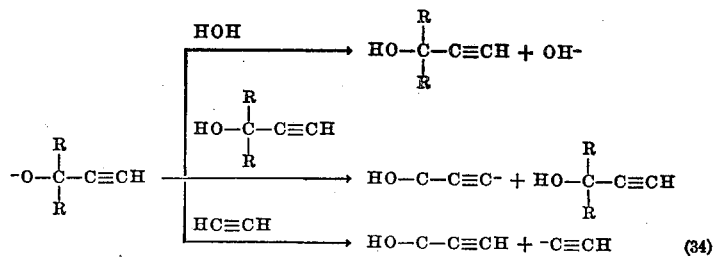

to form the acetylenic alcohol. The formation of the gamma-glycol would follow the familiar pattern laid down many times above.

Those techniques which involve a heat processing of 85% KOH or an aqueous solution of KOH in a mixture of higher alcohols and materials such as xylene, and those techniques which proceed from the heat processing of 85% KOH or aqueous solutions of KOH with higher alcohols alone for the purpose of effecting a binary or ternary azeotropic or pseudo-azeotropic distillation of water from the KOH, involve either of both the goals of obtaining a KOH with the desirable minimum water content or obtaining an optimum distribution of the KOH in the reaction medium. However, regardless of the variation of technique employed thereafter in the use of the thus-processed KOH, the principal reaction mechanics followed by the ketone or aldehyde in condensing with the acetylene is that described above for the case of the KOH-catalyzed condensation.

In this connection, under certain conditions a portion of the KOH may be transformed towards the corresponding alcoholate of the alcohol used, in which case the precise reaction mechanics as regards the base-catalyzed condensation are a mixture of those described for the KOH-catalyzed condensation and the alcoholate-catalyzed condensation.

Those techniques which in any way involve the pre-processing of 85% (or lower water content) KOH with acetals or with various other polyethers have been claimed to involve the formation of complexes of the KOH with the acetals. These complexes, if actually formed, then function in the capacity of the bases mentioned above in the formation of acetylide ions. When such procedures are accompanied by steps involving the heating of the KOH reagent with the acetals, the goals of such procedures may combine any or all of the objectives of: (1) accomplishing an optimum distribution of the KOH at elevated temperatures, and/or (2) pursuing the completion of formation of the hypothetical complex, and/or (3) accomplishing (where water-insoluble acetals or polyethers are employed) a maximum dehydration of the system prior to the introduction of the alkyne and ketone or aldehyde reactants.

Those techniques which involve the processing of mixtures of 85% KOH (or aqueous solutions of KOH) and higher boiling point acetals (or other polyethers) in the presence of such other reaction media components as xylene or alcohols of more than three carbons again pursue any one or a combination of the three objectives mentioned above.

It will thus be seen that, except for the first of the preparative methods discussed above, the prior art differs principally in the type and nature of the base catalyst employed, and/or in the methods of preparation of the base catalyst. It is also true that the prior art does differ in respect to the order of addition of reagent, catalyst and reactant material (a factor which has greater bearing on the production of acetylenic alcohols than it has on the production of acetylenic gamma-glycols, as will be shown in a later section of this specification), but the most important consideration in arriving at the most satisfactory process is, by far, the type of base catalyst employed and the method of preparing it, together with the means proposed for recovering the catalyst.

Relative to the first-named preparative method (Equations 16, 17 and 18), namely, a reaction between the alkali salts of acetylene with ketones or aldehydes, it suffices to say that all of the methods now known for the isolation of these alkali salts are far too expensive to merit commercial consideration of the synthesis of acetylenic alcohols or acetylenic gamma-glycols by this technique.

Dealing generally with the problem of employing alcoholates as the base-catalyst, both where this has been an explicit feature as well as where it has been implicit (as in instances where higher alcohols, mixtures of higher alcohols with xylene, and mixtures of higher alcohols with acetals have been used in dehydrating KOH or in preparing optimum dispersions of it by treating KOH-alcohol mixtures at high temperatures), it is possible to say that:

1. The formation of the alcoholates of the lower alcohols involves uneconomical procedures, since it requires the use of expensive alkali metals which are degraded to alkali metal hydroxides, and 2. The preparation of alcoholates of higher alcohols involves temperatures at which considerable side reactions are entailed. (Such undesirable side-reactions include Guerbet condensation of alcohols and/or conversion of the alcohol to aldehydes and acids, and/or decomposition of the KOH-alcohol mixture to carbonization products, potassium carbonate, potassium formate, methane and hydrogen—depending upon the particular alcohol used.)

The loss of alcohol by side-reactions in procedures falling into the second classification above is not only true of monohydric alcohols, but is equally true of polyhydric alcohols and their derivatives, thus leading to the conclusion that such procedures involve the additional expense of loss of reagents in the preparation of the required base catalyst.

The preparation of base-catalysts resulting from the processing of KOH with acetals at high temperatures for any of the purposes named above, of necessity, involves the loss of acetal reagent material insofar as acetals, as a group, may be stated categorically to be unstable in the presence of concentrated alkalis, particularly at elevated temperatures. Since polyethers such as acetals and ketals of the more complex type are costly materials, the decomposition of any portion of the polyethers entails an unnecessary expense in the synthesis of acetylenic alcohols and acetylenic gamma-glycols.

Since the immediate product of the condensation reactions between acetylene and aldehydes or ketones is, at least in part, the corresponding alcoholate or di-alcoholate derived from any acetylenic alcohol or acetylenic gamma-glycol, and since the isolation of all of the product in the form of the alcohol and/or glycol involves the hydrolysis of the alcoholate, the problem of recovering or reconstituting the base catalyst for re-use is complicated and becomes another criterion for evaluation of the prior art. Where the base catalyst is the alcoholate derived from a lower alcohol, the use of the KOH recovered from the hydrolysis step to reconstitute the alcoholate is, of course, out of the question not to speak of the cost involved in recovering such alcohol from the excess of water used in the hydrolysis procedure. Where the alcoholate of a higher alcohol or polyhydric alcohol, or the alcoholate of a derivative of polyhydric alcohols is involved, the reconstitution of the alcoholate by way of the KOH recovered from the hydrolysis is, of course, possible. This may take the form of either of the following procedures:

1. The stripping of water from a mixture of the aqueous solution of KOH (recovered from the hydrolysis procedure) and the recovered alcohol;

or,

2. The stripping of water from a mixture of the aqueous solution of KOH, the recovered alcohol, and a third component.

In the first procedure the reconstitution of the alcoholate involves the attainment of temperatures at which the side reactions mentioned above become especially serious phenomena, resulting in considerable losses of the alcohol. If the ternary system method (aqueous solution of KOH, alcohol and a third component) is employed, the judicious choice of the third component would reduce the higher temperatures necessitated by the first method, during the elimination of the water through the formation of a minimum boiling ternary azeotrope, but such systems are neither conducive to the complete stripping of water nor, by the same token, can they be made consistent with a complete reformation of the alcoholate. Furthermore, decomposition of the alcohol is not eliminated but is merely reduced.

It is well known that the minimum boiling azeotropes as well as minimum boiling pseudo-azeotropes enable the recovery of an 85% KOH at best, attended by a comparatively incomplete conversion of the alcohol to the alcoholate form.

Where the base catalyst is claimed to consist of a complex formed between ethers or polyethers of the acetal or ketal type, the avoiding of uneconomical losses of the acetal or ketal which would result from the stripping of water from a mixture of the polyether and the recovered aqueous KOH (where the boiling point of the polyether permits of such a technique), restricts the recovery of the KOH for reconstitution of the acetal-KOH complex to a technique involving: (a) the separation of the aqueous KOH phase from the polyether; (b) the evaporation of water from the aqueous KOH; (c) the intermediate attainment of a fused KOH and the stripping of water from the KOH to the desired degree of freedom from water in the recovered KOH. The use of this procedure involves great complexities with respect to the cost of the equipment involved as well as with respect to the corrosion problems encountered due to the extraordinarily high temperatures which must be attained to assure that degree of freedom from water in the recovered KOH necessary to the complete reformation of the KOH-polyether complex. The degree of dehydration required is very high if either complete re-formation of the complex and/or severe loss of the polyether is to be avoided.

Recapitulating the main arguments to be derived from the above consideration of the prior art, we find that:

I. Regarding the methods of preparing the base catalysts employed by previous workers in this field, the exigencies of commercial operation limit those worthy of consideration to:
1. Those procedures which involve the use of KOH in the company of acetals or ketals, or other polyethers; and
2. Those procedures which employ KOH in higher monohydric alcohols, polyhydric alcohols, or the derivatives of polyhydric alcohols.

Those workers in the field who have used the many variants in these techniques are further divisible into two classes:

A. Those who made no attempt to achieve a base of higher strength than that immediately provided by the KOH used; and
B. Those who attempted to obtain optimum distributions of the KOH used or who attempted to achieve a base of higher strength.

With regard to the use of commercially available KOH (85% KOB) in the company of acetals or ketals, we have underscored the tendency of KH containing water in significant quantities to exert a decomposing action on acetals and ketals. Thus, those workers who employed acetals or ketals without any attempt to achieve a base of higher strength but who employed the special properties of acetals or ketals in respect to their abilities to function as good solvents for KOH and acetylene are subject to the limitation that commercially available KOH, which contains at least 15% water, does exert a degrading action per se on acetals and ketals. The arguments that such workers achieved bases of special virtues (higher strength) founders on the well-known physical-chemical principle that without the application of an outside source of energy for the removal of water, no stronger base could have been achieved, since this would constitute a running uphill without any source of external influence. Those workers, who, in pursuit of achieving an optimum distribution of the KOH, or a base of higher strength, heated KOH in an acetal or in an alcohol (regardless of the nature of the alcohol) and employed techniques involving a degradation of the acetal, ketal or alcohol employed due to the destructive action of KOH on these materials at elevated temperatures. Especially is this true in the case of the heat processing of acetals and ketals in the presence of commercially available KOH, which contains 15% water. Despite the heat processing of any of these mixtures, any procedure which does not remove water to achieve a KOH containing less than 15% by weight of water, for the reasons given above, would not achieve a base of higher strength. Especially worthy of mention in this connection are those techniques which employ either KOH or NaOH and alcohols or ether alcohols to achieve a conversion to alkali alcoholates. The temperature requisite to the completion of such an operation, of necessity, involve substantial losses of the alcohol in promoting the formation of the alcoholate. At best it may be said that most of the procedures involving the heat-treating of the mixtures mentioned above achieve a better distribution of the KOH from the viewpoint of particle size (insofar as this would affect rates of solution of the KOH in the medium of reaction).

II. In respect to recovering the base for re-use, we have observed that each of the procedures in the above-mentioned prior art involves either important losses of reagents or such complications with respect to equipment required as to eliminate them from consideration.

We have discovered a method of preparation of KOH for use as a catalyst in promoting the subject condensations as well as a method of reworking the aqueous solution of KOH resulting from the hydrolysis step of the condensation process sequence which: (1) achieves a virtually quantitative removal of water from the KOH, thereby providing us with a base of maximum strength; (2) results in a finely dispersed KOH, thereby assisting in obtaining an optimum distribution of the KOH in the condensation medium without requiring heating with the condensation medium to achieve the desired level of distribution; (3) permits its use in conjunction with acetals and/or ketals or other polyethers without engendering any of the losses normally attendant upon the use with such materials of a KOH containing water; (4) produces a better yield in other conventional media for the condensation such as xylene, toluene, benzene, etc.; (5) exerts the special beneficial actions on the execution of the subject condensation operations which are mentioned below in the section devoted to the advantages of our process; (6) is capable of execution, on a practical commercial scale without entailing complicated groupings of equipment or encountering severe corrosion conditions for the equipment employed; and (7) yields all of the benefits mentioned above without involving any undesirable loss of reagents in arriving at the final base catalyst.

Starting from an 85% KOH, this procedure of preparation of the KOH-catalyst consists of adding the KOH (in any form) to any high boiling, inert-to-KOH liquid such as a high boiling hydrocarbon fraction (having a boiling point of 110° C. as a minimum, but preferably higher) and heating the mixture to 110° C. or higher, preferably (if the medium permits) to a temperature lying in the range between 160° C. and 190° C., under vigorous agitation. An optimum liquid medium for this operation is one which will exert a low vapor pressure when heating to the specified preferred range. In the neighborhood of between 110° C. to 120° C., it will be observed that the 85% KOH exhibits a tendency to go into solution in its own water-of-hydration and thereby become available as a liquid material which, under the vigorous agitation, is distributed in fine particles throughout the liquid medium mass. Starting at any point at which the KOH becomes distributed in the form of liquid particles throughout the inert liquid medium, we have discovered that by slowly adding calcium carbide the KOH may be dehydrated to a point approaching the quantitative elimination of water, providing that the slurry medium permits the attainment of a temperature of approximately 190° C. and providing that a slight excess of calcium carbide (not more than 10%) with respect to water content of the system is employed. This occurs through a reaction between the calcium carbide and the droplets of molten 85% KOH, producing acetylene and calcium hydroxide in addition to the dehydrated KOH. It is possible to carry out the entire operation at 190° C. or to initiate the addition of calcium carbide at the temperature at which the 85% KOH becomes distributed in liquid particles, raising the temperature progressively and finishing off the operation at 190° C. The speed with which the operation can be effected is dependent upon the time-temperature schedule employed and upon the gas-disengagement surface requirements of the particular liquid medium-slurry mixture employed. With an amount of calcium carbide with respect to 85% KOH as will be given in the illustrative example below, the operation is pursued until no further acetylene is evolved from the system. Employing a proper and uniform rate of addition of the calcium carbide, there will result a fine distribution of dehydrated KOH and calcium hydroxide. Upon cessation of the acetylene evolution, the KOH-calcium hydroxide is cooled and filtered to separate the KOH-calcium hydroxide solids from the inert liquid medium, that portion of the liquid medium which is mechanically entrapped in the filter cake being removed, if desired, by successive washes on the filter, with small quantities of the medium which is to be employed in carrying on the acetylene-carbonyl group compound condensation reaction.

It is important to observe all precautions against drawing air or gases containing moisture or carbon dioxide through the filter cake during the filtration operation.

Starting from an aqueous solution of KOH, a satisfactorily prepared KOH for use in conjunction with acetals or other acetylene-carbonyl group compound condensation reaction media may be prepared by stripping water from a mixture of the aqueous KOH and an inert medium of the characteristics as mentioned above until water ceases to be freely evolved from the system. The point at which water ceases to be freely distilled at temperatures in the range of 110° C. will coincide with the formation of a KOH of roughly 15% residual water content. At this point the KOH thus obtained may be processed as mentioned above with calcium carbide to obtain the more completely dehydrated KOH yield by the above-mentioned procedure. The KOH-calcium hydroxide mixtures thus obtained are employed in the synthesis of acetylenic alcohols and acetylenic gamma-glycols in accordance with the illustrative example given in a later section of this specification.

The advantages derived from a KOH catalyst prepared by the methods described generally above are manifold. By virtue of its almost quantitative dehydration, it is capable of use with acetals or ketals as the condensation reaction media under the temperature conditions employed for acetylenic alcohol and acetylenic gamma-glycol condensations without any undesirable decomposition of the acetals or ketals. By virtue of its finely divided state at the end of the processing procedure mentioned above, the necessity is eliminated for any heat-processing to accomplish an optimum distribution in the condensation reaction media, a processing procedure which is essential to much of the prior art and which, in the cases wherein acetals, ketals, monohydric alcohols, polyhydric alcohols and the derivatives of polyhydric alcohols are employed, involves a loss of both KOH and the condensation reaction medium. The advantages of the KOH catalyst as prepared by us are not, however, restricted to the virtual elimination of destructive action on labile condensation reaction media, since the KOH catalyst as prepared by us will, in all media, exert the beneficial effects on the condensation reactions which we treat with below.

As one purely experimental confirmation of this last statement, we ground an 85% KOH (under conditions carefully selected to prevent a further increase in the water content of the KOH, and under conditions such that a degeneration of the KOH by contact with carbon dioxide was prevented) so that we ultimately achieved a mean particle size of the ground 85% KOH corresponding to the mean particle size of the KOH obtained by the method generally described above. The thus processed 85% KOH was distributed in methylal and employed as a base catalyst strictly in accordance with the actual condensation procedures laid down in Examples 1 and 2 below.

The conversion of methyl butinol obtained when following the procedures set down in Example 2 varied from 20% to 30% of theoretical on repeated trials as compared to the conversions obtained in Example 2. We found that a considerable diversion of acetone, using the 85% KOH, to the formation of the polymeric condensation products of acetone itself took place.

When an 85% KOH pulverized as mentioned above was used in conjunction with methylal as the condensation reaction medium according to the procedures laid down in Example 1 for the synthesis of dimethylhexinediol, we obtained conversions ranging from zero to 10% on repeated trials as compared with the conversions obtained by the KOH catalyst as prepared by our methods and used under the identical conditions.

In connection with both of the conversions mentioned above, when an 85% KOH was used of a mean particle size equivalent to that obtained by our method of processing the KOH, it is important to observe that not only were the conversions of acetone to the desired condensation products very low, but considerable losses of acetone to form polymeric condensation products of acetone itself took place. This experience relative to the competitive merits of an 85% KOH vs. the KOH catalyst as prepared by us proved to be general regardless of the condensation reaction medium employed, the extents of conversion and the extents of diversion of acetone to form polycondensation products of the acetone itself varying with the extent of solubility of 85% KOH in the particular medium chosen.

The comparative merits of an 85% KOH vs. those of the KOH catalyst as prepared by us is susceptible of more than purely experimental documentation since the results are capable of being rationalized according to the following lines of logic:

As stated above, the generalized conclusion of our experiments was that an 85% KOH of particle size equivalent to that obtained in the KOH catalyst prepared by us tended to favor the production of diacetone alcohol and the higher polymeric condensation products of acetone over the formation of the desired acetylene-acetone condensation products. Of necessity, the influence of alkaline conditions on acetone is to induce an equilibrium between diacetone alcohol (as the simplest of the polycondensation products of acetone itself) and acetone. This follows from Equations 12, 13, 14, and 15 which illustrate the mechanics of this phenomenon. Thus, under the conditions of base-catalysis, the multi-directional equilibria pattern represented by Equation 35 is set up in the acetone-acetylene condensation reaction system. Both the equilibrium in the direction of the polycondensation products of acetone itself, and the equilibria in the direction of the acetylene-acetone condensation products are base-catalyzed, and therefore, both result in the formation of water as a co-product of the formation of the $CH_3COCH_2^-$ ion, in one case, and the $HC\equiv C^-$ ion in the other. Since the yield of acetylenic condensation compounds is almost quantitative under the proper conditions, it must be concluded that in the presence of anhydrous KOH, the point of equilibrium lies overwhelmingly to the right. The two possible major reactions are, however, distinguished from one another by the absence of any reaction of ketones and aldehydes with acetylenes or 1-alkynes in aqueous alkali solutions while, in sharp contrast, the condensation of acetone to diacetone alcohol proceeds over a wide range of concentrations of aqueous alkalis. It is, furthermore, well known that the equilibrium between acetone and diacetone alcohol favors acetone.

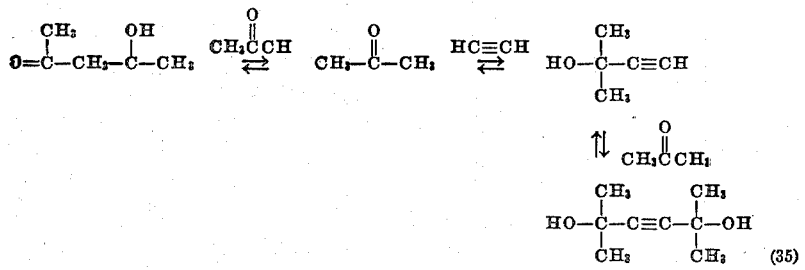

These facts: (1) that the equilibrium between diacetone alcohol and acetone favors acetone; (2) that the condensation of acetone to diacetone alcohol proceeds over a wide range of concentrations of aqueous alkalis; and (3) that despite the proved favoring of the condensation products with acetylene in the equilibrium between acetone (and its condensation products) with acetylene, the reaction with acetylene will not take place over a wide range of concentrations of aqueous alkalis, all tend to demonstrate that the beneficial action of the KOH catalyst as prepared by us flows from the virtual elimination of water rather than from any effect flowing directly or indirectly from the particle size of the final product. This does not negate the beneficial effects relative to rates of solution and ease of agitating the reaction mass deriving from a finely devided KOH.

Expanding on the thesis of the effect of water on the equilibria involved in the acetone-acetylene condensation reaction system, with special reference to the manufacture of gamma-glycols, the following factors are worthy of the greatest attention:

1. The fact that all of the conventional reaction media (the polyethers, benzene, xylene, toluene, high molecular weight alcohols, etc.) have a low tolerance for water and the established fact that the condensation products in all directions of the equilibrium pattern are, under the conditions of the acetylene and aldehyde or ketone condensations, found to a considerable extent in their alcoholate derivative forms leads to the conclusion that a considerable portion of the water resulting from the ion formation passes into solution in the excess of KOH present in the condensation reaction system as a result of the high tolerance and high retention for water exhibited by KOH. This immediately affects the ability of KOH to pass from its solid state to a state of solution in the reaction medium since hydrated KOH exhibits a markedly lower solubility in the conventional reaction media.

2. Insofar as the formation of dimethylhexinediol involves two waters of formation as opposed to one water of formation for the case of methyl butinol and diacetone alcohol, the use of a KOH of high initial water content, both by its immediate effect of diluting the KOH and its secondary effect of reducing the solubility of the KOH in the reaction medium favors a general displacement of the equilibrium shown in Equation 36 in the direction of diacetone alcohol.

$$KOH + HC\equiv CH \rightleftarrows HC\equiv C^- + H_2O$$

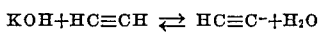

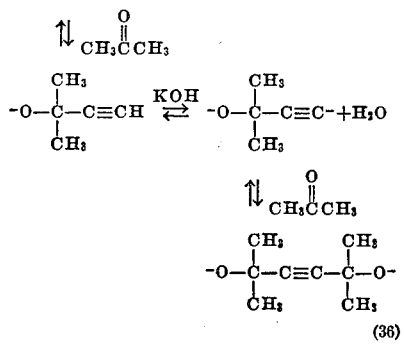

(36)

The use of the KOH catalyst as prepared by us (which has the characteristic of an initial, virtually quantitative, elimination of water) is obviously therefore most essential to a high conversion to dimethyl hexine diol and a low diversion of acetone to diacetone alcohol or the higher polymers of acetone.

In summary, we have:

1. Established the thesis that the fundamental factor in any general system of preparing acetylenic alcohols and acetylenic gamma-glycols is the method of preparation of the base catalyst, and the method of recovering the base catalyst for re-use.

2. Proposed a method of preparation of a KOH base catalyst from both the commercially-available 85% KOH and from an aqueous solution of KOH. (Note.—The problem of recovering the base catalyst for the type of catalyst used by us and the method of preparation of the catalyst proposed by us essentially consists of treating an aqueous solution of KOH as per the generalized technique given above in preparing the KOH catalyst from an aqueous solution of KOH, since we recover the KOH catalyst initially employed as an aqueous solution of KOH after the hydrolysis procedure of the acetylene and aldehyde or ketone condensation process sequence.)

3. Stated the advantages of the KOH catalyst prepared by use to consist of:

a. No noticeable loss of reagents in the preparation of the catalyst;

b. An inertness, under the generalized conditions per se for the acetylene and aldehyde or ketone condensation of the conventional solvent and/or slurry media for these reactions, thereby eliminating either losses of KOH or of the reaction media. (Note.—Especially since the manner of use of the catalyst once prepared does not involve any processing procedures other than those belonging to the generalized conditions for the subject condensation reactions as a class.)

c. A level of "anhydrousness" fundamentally consistent with, and essential to the physical chemistry of the acetylene and aldehyde and ketone condensation reactions as a class, if high extents of reaction to form either acetylenic alcohols or gamma-glycols is to be realized. (Note.—Especially where the aldehyde or ketone employed is one possessing alpha-hydrogens, and is hence susceptible to the formation of poly-condensation polymerization products under a condition of base-catalysis.)

As a corrollary to item #1 of this paragraph, it is technically correct, and can be supported from the level of development of the practical and theoretical aspects of the art to regard the conditions of molar relationships of the acetylene (or any 1-alkyne)-aldehyde or ketone-base catalyst reaction mixture, temperature during the condensation reaction proper, as well as conditions of pressure (if gaseous acetylenic reactants are employed), time of reaction and further conditions of processing such as the hydrolysis step, both for the cases of the synthesis of acetylenic alcohols and gamma-glycols, to be a matter of generalized knowledge for those skilled in the art. The choice of the condensation reaction medium is hereby, for all of the reasons explicitly and implicitly given above, regarded to be a matter of common knowledge for those skilled in the art. Consequently, our contribution is to be evaluated as a general, rather than a specific contribution to the art of synthesizing acetylenic alcohols and gamma-glycols. Therefore, neither the remarks made above, nor the examples following below are to be construed as limiting the invention to the field of synthesis of methylbutinol and/or dimethylhexinediol.

The following examples, therefore, are typical applications of our generalized invention to the specific problems of synthesizing methylbutinol (3 - methyl, 3-ol, hexine-1) and dimethylhexinediol (2,5-dimethyl, 2,5-diol, hexine-3):

*Example 1.—The synthesis of dimethylhexinediol*

To 500 cc. kerosene (boiling point, 195° C. or over) in a flask fitted with a stirrer, reflux condenser, and thermometer, there is added 198 g. of 85% KOH (three mols 100% KOH). The mixture is heated, with vigorous stirring, to 180–190° C. During a period of one hour, 73 g. of 80% calcium carbide (10% excess) is added in portions as the evolution of gas permits. The acetylene evolved may be collected in a conventional gasometer from which it may ultimately be displaced for use in the later stages of this synthesis. The temperature is maintained at 180–190° C. with continued agitation, for one hour after the addition of the calcium carbide is complete. The mixture is allowed to cool and the finely divided solids are collected on a sintered glass funnel. The filter cake is washed three times with 200 cc. portions of dry petroleum ether, taking precautions to exclude atmospheric moisture and carbon dioxide. The petroleum ether is removed as completely as possible in a vacuum dessicator. The dry solids are then transferred to a wide-mouth vessel and slurried in 400 cc. of dry methylal which is free from methanol. The dispersion of the KOH in the methylal is attended by little or no heat rise. The top of the vessel is then closed by a rubber stopper carrying a gas-dispersion tube, multiple-bladed agitator, thermometer, dropping funnel, and gas exit tube. With agitation and cooling, the slurry is saturated with acetylene. The temperature of the reaction mixture is allowed to rise to 13–15° C., and 57 g. (0.984 mol) of dry acetone is added rapidly through the dropping funnel. After 15 minutes the mass begins to thicken and at the end of 35 minutes the mass sets to a thick paste with a considerable evolution of heat requiring strong cooling to maintain the temperature at 13–15° C. The reaction mixture is maintained at 13–15° C. for two hours additional, after which it is cooled to 0° and treated with 300 g. ice. The methylal solution which contains the product is separated from the slurry of solids in the KOH solution and the slurry thoroughly washed with methylal. The methylal solution combined with the washings is washed twice with small portions of saturated sodium chloride solution and the solvent distilled through a fractionating column. The fraction distilling after the methylal consists of 17 g. methylbutinol. The methylbutinol so collected may be introduced into the next batch of reaction mixture employed for the manufacture of dimethylhexinediol with the appropriate allowances in the amount of acetone and acetylene used. The residue of crystalline dimethylhexinediol weighs 54 g. (equivalent to 44 g. acetone). The quantity of methylbutinol isolated above is equivalent to 12 g. of acetone, while the quantity of dimethylhexinediol, as noted above, is equivalent to 44 g. of acetone. The combined products therefore represent 56 g. of acetone corresponding to a 98% yield.

*Example 2.—The synthesis of methylbutinol*

A mixture of an approximately 40% aqueous solution of KOH containing 198 g. of KOH with 500 cc. kerosene is heated in a flask fitted with a stirrer, thermometer and water trap arranged so as to return continuously the kerosene to the still pot. The mixture is heated under reflux until water ceases to collect in the trap. The trap is replaced by a reflux condenser and 73 g. of 80% calcium carbide is added in portions with the preparation of the KOH being carried out as described in Example 1. The KOH is slurried in 600 cc. methylal and the suspension saturated with acetylene at 5° C. The temperature of the reaction mixture is allowed to rise to 13° C. to 15° C. and 57 g. dry acetone added rapidly. Fifteen minutes after the addition is complete, the reaction mixture is cooled to 0° C. and 300 g. of ice is added. The methylal solution is separated, the aqueous layer-sludge washed several times with methylal and the washings combined with the main batch. The combined methylal solutions are washed twice with small portions of a saturated calcium chloride solution and the solvent is distilled. There is then distilled a fraction of 75 gms. of methylbutinol corresponding to a yield of 91% based on acetone. A crystalline residue of 4.1 gms. of dimethylhexinediol remains in the flask. The combined yield, based on acetone, is 97%.

We claim:

1. In the process of manufacturing acetylenic products by the interaction of an acetylenic hydrocarbon and a compound of a group consisting of aldehydes and ketones in the presence of anhydrous potassium hydroxide, the improvement which comprises mixing concentrated potassium hydroxide containing water with a hydrocarbon having a boiling point of at least about 190° C. and which is inert with respect to potassium hydroxide, heating the mixture to a temperature of from 180° to 190° C. with agitation and while continuing the agitation and maintaining the temperature slowly adding to the mixture a quantity of calcium carbide in excess of that necessary to react with the water content of the concentrated potassium hydroxide, collecting the acetylene gas evolved from the reaction between the calcium carbide and the water content of the concentrated potassium hydroxide, cooling the mixture resulting from the foregoing operations and filtering off the solids resulting from such operations from the hydrocarbon under conditions preventing access of air and moisture thereto, forming a slurry of the filtered solids in a liquid medium, introducing an acetylenic hydrocarbon into the resulting slurry and saturating the slurry therewith, thereafter introducing one of the compounds of said group into the slurry while maintaining a temperature of from 13° to 15° C. to effect the desired reaction, and thereafter hydrolyzing the reaction product to produce the acetylenic product.

2. The process as claimed in claim 1 in which the concentrated potassium hydroxide comprises an 85% solution and in which the hydrocarbon is kerosene.

3. The process as claimed in claim 1 in which the acetylene evolved from the reaction between the calcium carbide and the water content of the concentrated potassium hydroxide is introduced into the slurry formed at a later stage in the process.

4. The process as claimed in claim 1 in which the liquid medium used to form the slurry is methylal.

5. The process as claimed in claim 1 in which the acetylenic hydrocarbon is acetylene and in which the compound of said group is acetone.

6. The process as claimed in claim 1 in which the product includes a minor proportion of an acetylenic alcohol and a major proportion of acetylenic gamma glycol.

ABRAHAM BROTHMAN.
HARRY GOLD.
PHILIP LEVINE.

REFERENCES CITED

The following references are of record in the file of this patent:

UNITED STATES PATENTS

| Number | Name | Date |
| --- | --- | --- |
| 731,652 | Atkins | June 23, 1903 |
| 2,163,720 | Vaughn | June 27, 1939 |
| 2,326,099 | Kokatnur et al. | Aug. 3, 1943 |
| 2,385,547 | Smith | Sept. 25, 1945 |
| 2,393,108 | Kokatnur | Jan. 15, 1946 |
| 2,435,524 | Weizmann | Feb. 3, 1948 |